US007063083B2

(12) United States Patent
Ohmiya et al.

(10) Patent No.: US 7,063,083 B2
(45) Date of Patent: Jun. 20, 2006

(54) WAFER DIVIDING METHOD AND APPARATUS

(75) Inventors: Naoki Ohmiya, Tokyo (JP); Yusuke Nagai, Tokyo (JP); Masaru Nakamura, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/183,828

(22) Filed: Jul. 19, 2005

(65) Prior Publication Data

US 2006/0016443 A1    Jan. 26, 2006

(30) Foreign Application Priority Data

Jul. 23, 2004    (JP) ............................. 2004-215111

(51) Int. Cl.
*B28D 1/00*    (2006.01)
*B26F 3/00*    (2006.01)

(52) U.S. Cl. .................... 125/23.01; 225/96.5
(58) Field of Classification Search ............ 125/12, 125/23.01, 13.01, 35; 225/96.5, 96, 93, 2, 225/1, 100
See application file for complete search history.

(56) References Cited

U.S. PATENT DOCUMENTS 3,766,638 A * 10/1973 Moore ..................... 438/464
4,140,260 A * 2/1979 Gantley ..................... 225/93
4,296,542 A * 10/1981 Gotman ..................... 438/17
4,653,680 A * 3/1987 Regan ....................... 225/104
5,769,297 A * 6/1998 Loomis et al. ............. 225/96.5
6,513,694 B1 * 2/2003 Xu et al. ................... 225/96.5
6,892,917 B1 * 5/2005 Chen et al. ................ 225/96.5
6,932,259 B1 * 8/2005 Chen et al. ................ 225/104
2005/0090077 A1    4/2005 Nagai et al.

FOREIGN PATENT DOCUMENTS

JP    3408805    3/2003

\* cited by examiner

*Primary Examiner*—Robert A. Rose
(74) *Attorney, Agent, or Firm*—Smith, Gambrell & Russell, LLP

(57) ABSTRACT

A method of dividing a wafer whose strength is reduced along a plurality of dividing lines formed on the front surface in a lattice pattern, along the dividing lines, comprising: a tape affixing step for affixing a protective tape to one surface side of the wafer; a holding step for positioning a first suction-holding member and a second suction-holding member on both sides of a dividing line and suction-holding the wafer on the first suction-holding member and the second suction-holding member through the protective tape; and a dividing step for moving the first suction-holding member and the second suction-holding member in a direction for separating them from each other to exert tensile force in a direction perpendicular to the dividing line.

7 Claims, 8 Drawing Sheets

(a)

(b)

(a)

(b)

WAFER DIVIDING METHOD AND APPARATUS

FIELD OF THE INVENTION

The present invention relates to a method of dividing a wafer having dividing lines formed on the front surface in a lattice pattern, along the dividing line and to a wafer dividing apparatus.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a circuit such as IC or LSI is formed in each of the sectioned areas. Individual semiconductor chips are manufactured by cutting this semiconductor wafer along the dividing lines to divide it into the areas having a circuit formed thereon. An optical device wafer comprising gallium nitride-based compound semiconductors laminated on the front surface of a sapphire substrate is also cut along predetermined dividing lines to be divided into individual optical devices such as light emitting diodes or laser diodes which are widely used in electric appliances.

Cutting along the dividing lines of the above semiconductor wafer or optical device wafer is generally carried out by using a cutting machine called "dicer". This cutting machine comprises a chuck table for holding a workpiece such as a semiconductor wafer or optical device wafer, a cutting means for cutting the workpiece held on the chuck table, and a cutting-feed means for moving the chuck table and the cutting means relative to each other. The cutting means comprises a rotary spindle, a cutting blade mounted on the spindle and a drive mechanism for rotary-driving the rotary spindle. The cutting blade comprises a disk-like base and an annular edge that is mounted onto the side wall peripheral portion of the base and formed as thick as about 20 µm by fixing diamond abrasive grains having a diameter of about 3 µm to the base by electroforming.

Since a sapphire substrate, silicon carbide substrate, etc. have high Mohs hardness, cutting with the above cutting blade is not always easy. Further, as the cutting blade has a thickness of about 20 µm, the dividing lines for sectioning devices must have a width of about 50 µm. Therefore, in the case of a device measuring 300 µm×300 µm, the area ratio of the streets to the wafer becomes 14%, thereby reducing productivity.

As a means of dividing a plate-like workpiece such as a semiconductor wafer, a laser processing method for applying a pulse laser beam capable of passing through the workpiece with its focusing point set to the inside of the area to be divided is also attempted nowadays and disclosed by Japanese Patent No. 3408805. In the dividing method making use of this laser processing technique, the workpiece is divided by applying a pulse laser beam at an infrared range capable of passing through the workpiece from one surface side of the workpiece with its focusing point set to the inside to continuously form a deteriorated layer in the inside of the workpiece along the dividing lines and exerting external force along the dividing lines whose strength has been reduced by the formation of the deteriorated layers.

To divide a wafer having deteriorated layers formed continuously along the dividing lines into individual chips by exerting external force along the dividing lines of the wafer, the applicant of this application has proposed a technology for dividing a wafer into individual chips by expanding a protective tape affixed to the wafer to apply tensile force to the wafer as Japanese Patent Application No. 2003-361471.

In the method of applying tensile force to the wafer by expanding the protective tape affixed to the wafer, when the protective tape affixed to the wafer is expanded, tensile force acts radially on the wafer. Therefore, tensile force is applied in a random direction to the dividing lines formed in a lattice pattern, whereby the wafer is divided irregularly and undivided areas remain. When a wafer having a test metal pattern called "test element group (TEG)" for testing the function of each circuit on dividing lines is divided along the dividing lines by expanding the protective tape as described above, a problem may arise that irregular force acts on the above metal pattern, whereby the metal pattern is broken jaggedly, produces a contaminant and reduces the quality of each device.

SUMMARY OF THE INVENTION

It is an object of the present invention to provide a method of dividing a wafer whose strength has been reduced along dividing lines, along the dividing lines accurately and surely; and a wafer dividing apparatus.

According to the present invention, firstly, the above object can be attained by a method of dividing a wafer whose strength has been reduced along a plurality of dividing lines formed on the front surface in a lattice pattern, along the dividing lines, comprising:

a tape affixing step for affixing a protective tape to one surface side of the wafer;

a holding step for positioning a first suction-holding member and a second suction-holding member on both sides of a dividing line and suction-holding the wafer on the first suction-holding member and the second suction-holding member through the protective tape; and a dividing step for moving the first suction-holding member and the second suction-holding member in a direction for separating them from each other to exert tensile force in a direction perpendicular to the dividing line.

According to the present invention, secondly, the above object of the present invention can be attained by a wafer dividing apparatus for dividing a wafer whose strength has been reduced along a plurality of dividing lines formed on the front surface in a lattice pattern, along the dividing lines, comprising:

a tape holding means for holding a protective tape affixed to one surface side of the wafer; and a tensile force application means for suction-holding the wafer supported to the tape holding means on both sides of a dividing line through the protective tape and exerting tensile force to the wafer in a direction perpendicular to the dividing lines.

The above tensile force application means comprises a first suction-holding member and a second suction-holding member for suction-holding the wafer through the protective tape on both sides of a dividing line, and a moving means for moving the first suction-holding member and the second suction-holding member in a direction for separating them from each other.

The above protective tape is affixed to an annular frame, and the tape holding means is composed of a frame holding means for holding the annular frame. The frame holding means comprises a cylindrical body and an annular frame holding member mounted on the upper end of the body, and the first suction-holding member, the second suction-holding member and the moving means are installed within the cylindrical body. The first suction-holding member, the second suction-holding member and the moving means are mounted on the base, and the frame holding means is mounted on a movable table mounted on the base in such a manner that it can be moved in a predetermined direction. The frame holding means is turnably supported on the movable table, and a turning means for turning the frame holding means is provided.

In the present invention, the first suction-holding member and the second suction-holding member are positioned on both sides of a dividing line, the wafer is suction-held on the first suction-holding member and the second suction-holding member through the protective tape, and the first suction-holding member and the second suction-holding member are moved in a direction for separating them from each other to exert tensile force in a direction perpendicular to the dividing line. Therefore, the wafer can be divided along the dividing line whose strength has been reduced, accurately and surely. Consequently, even when the wafer has a test metal pattern called "test element group (TEG)" for testing the function of each circuit on the dividing lines, this metal pattern can also be fractured along the dividing line accurately.

DETAILED DESCRIPTION OF THE PREFERRED EMBODIMENTS

Preferred embodiments of the wafer dividing method and apparatus according to the present invention will be described hereinunder with reference to the accompanying drawings.

Figure 1:
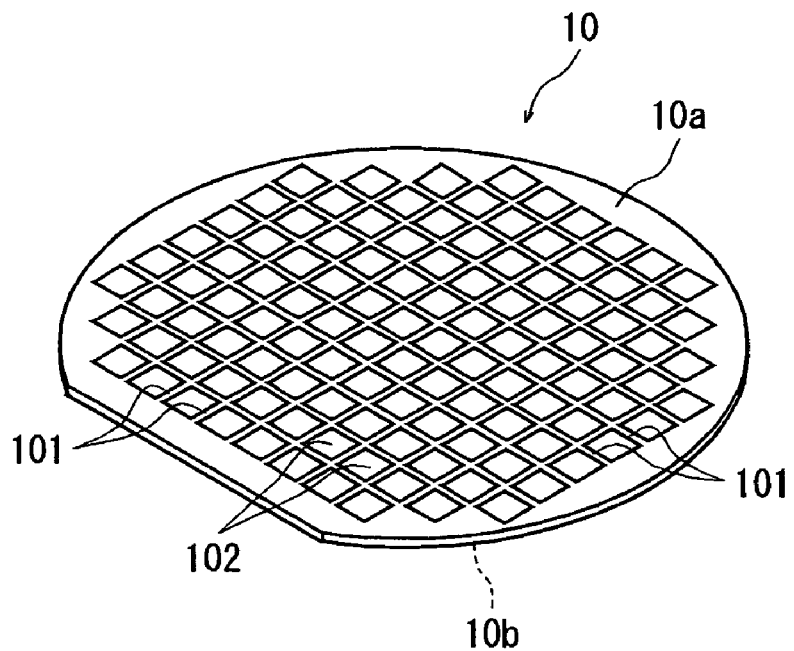
FIG. 1 is a perspective view of a semiconductor wafer to be divided by the wafer dividing method of the present invention.

FIG. 1 is a perspective view of a semiconductor wafer as a wafer to be processed according to the present invention. The semiconductor wafer 10 shown in FIG. 1 is a silicon wafer having a thickness of, for example, 300 µm, and a plurality of dividing lines 101 are formed on the front surface 10a in a lattice pattern. On the front surface 10a of the semiconductor wafer 10, a circuit 102 is formed as function element in each of a plurality of areas sectioned by the plurality of dividing lines 101.

The method of dividing this semiconductor wafer 10 into individual semiconductor chips will be described hereinunder.

To divide the semiconductor wafer 10 into individual semiconductor chips, a step of forming a deteriorated layer in the inside of the semiconductor wafer 10 along the dividing lines 101 by applying a pulse laser beam capable of passing through the semiconductor wafer 10 along the dividing lines 101 is carried out, thereby reducing the strength along the dividing lines 101. This deteriorated layer forming step is carried out by using a laser beam processing machine 1 shown in FIGS. 2 to 4. The laser beam processing machine 1 shown in FIGS. 2 to 4 comprises a chuck table 11 for holding a workpiece, a laser beam application means 12 for applying a laser beam to the workpiece held on the chuck table 11, and an image pick-up means 13 for picking up an image of the workpiece held on the chuck table 11. The chuck table 11 is designed to suction-hold the workpiece and moved in a processing-feed direction indicated by an arrow X and an indexing-feed direction indicated by an arrow Y in FIG. 2 by a moving mechanism that is not shown.

Figure 3:
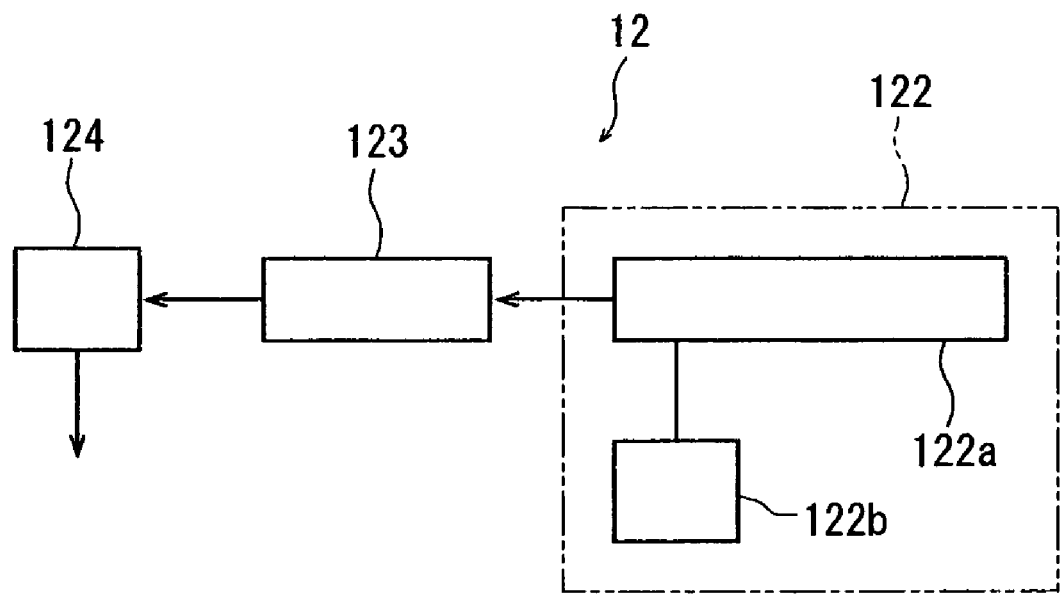
FIG. 3 is a block diagram schematically showing the constitution of the laser beam application means of the laser beam processing machine shown in FIG. 2.
Figure 4:
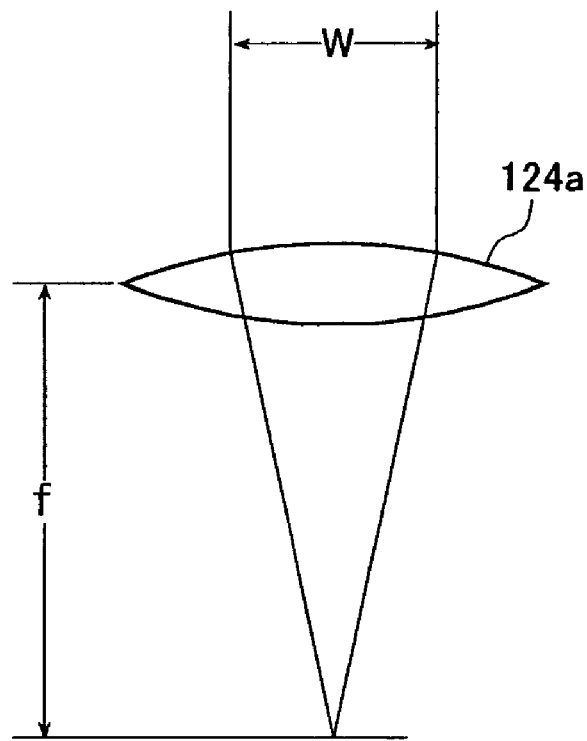
FIG. 4 is a schematic diagram showing the focusing spot diameter of a pulse laser beam.

The above laser beam application means 12 has a cylindrical casing 121 arranged substantially horizontally. In the casing 121, as shown in FIG. 3, there are installed a pulse laser beam oscillation means 122 and a transmission optical system 123. The pulse laser beam oscillation means 122 is constituted by a pulse laser beam oscillator 122a composed of a YAG laser oscillator or YVO4 laser oscillator and a repetition frequency setting means 122b connected to the pulse laser beam oscillator 122a. The transmission optical system 123 comprises suitable optical elements such as a beam splitter, etc. A condenser 124 housing condensing lenses (not shown) constituted by a set of lenses that may be known per se is attached to the end of the above casing 121. A laser beam oscillated from the above pulse laser beam oscillation means 122 reaches the condenser 124 through the transmission optical system 123 and is applied from the condenser 124 to the workpiece held on the above chuck table 11 at a predetermined focusing spot diameter D. This focusing spot diameter D is defined by the expression D (µm)=4×λ×f/(π×W) (wherein λ is the wavelength (µm) of the pulse laser beam, W is the diameter (mm) of the pulse laser beam applied to an objective lens 124a, and f is the focusing distance (mm) of the objective lens 124a) when the pulse laser beam showing a Gaussian distribution is applied through the objective lens 124a of the condenser 124 as shown in FIG. 4.

The image pick-up means 13 attached to the end of the casing 121 constituting the above laser beam application means 12 comprises an infrared illuminating means for applying infrared radiation to the workpiece, an optical system for capturing infrared radiation applied by the infrared illuminating means, and an image pick-up device (infrared CCD) for outputting an electric signal corresponding to infrared radiation captured by the optical system, in addition to an ordinary image pick-up device (CCD) for picking up an image with visible radiation in the illustrated embodiment. An image signal is transmitted to a control means that will be described later.

The deteriorated layer forming step which is carried out by using the above laser beam processing machine 1 will be described with reference to FIG. 2, FIGS. 5(a) and 5(b) and FIG. 6.

Figure 2:
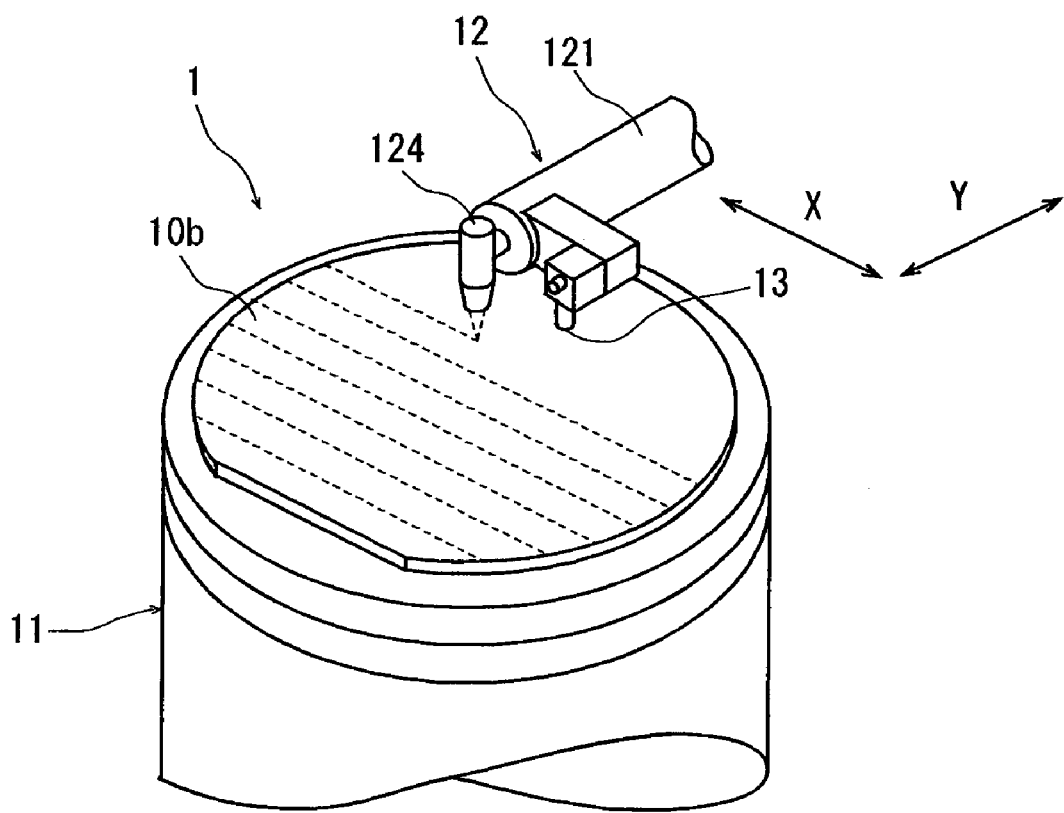
FIG. 2 is a perspective view of the principal section of a laser beam processing machine for carrying out a deteriorated layer forming step of the wafer dividing method of the present invention.

In this deteriorated layer forming step, the semiconductor wafer 10 is first placed on the chuck table 11 of the laser beam processing machine 1 shown in FIG. 2 in such a manner that the back surface 10b faces up and suction-held on the chuck table 11. The chuck table 11 suction-holding the semiconductor wafer 10 is positioned right below the image pick-up means 13 by a moving mechanism that is not shown.

After the chuck table 11 is positioned right below the image pick-up means 13, an alignment work for detecting the area to be processed of the semiconductor wafer 2 is carried out by using the image pick-up means 13 and the control means that is not shown. That is, the image pick-up means 13 and the control means (not shown) carry out image processing such as pattern matching, etc. to align a dividing line 101 formed in a predetermined direction of the semiconductor wafer 10 with the condenser 124 of the laser beam application means 12 for applying a laser beam along the dividing line 101, thereby performing the alignment of a laser beam application position. The alignment of the laser beam application position is also carried out on dividing lines 101 formed on the semiconductor wafer 10 in a direction perpendicular to the predetermined direction. Although the front surface 10a having the dividing lines 101 formed thereon of the semiconductor wafer 10 faces down at this point, an image of the dividing line 101 can be taken through the back surface 10b as the image pick-up means 13 comprises an infrared illuminating means, an optical system for capturing infrared radiation and an image pick-up device (infrared CCD) for outputting an electric signal corresponding to the infrared radiation as described above.

Figure 5:
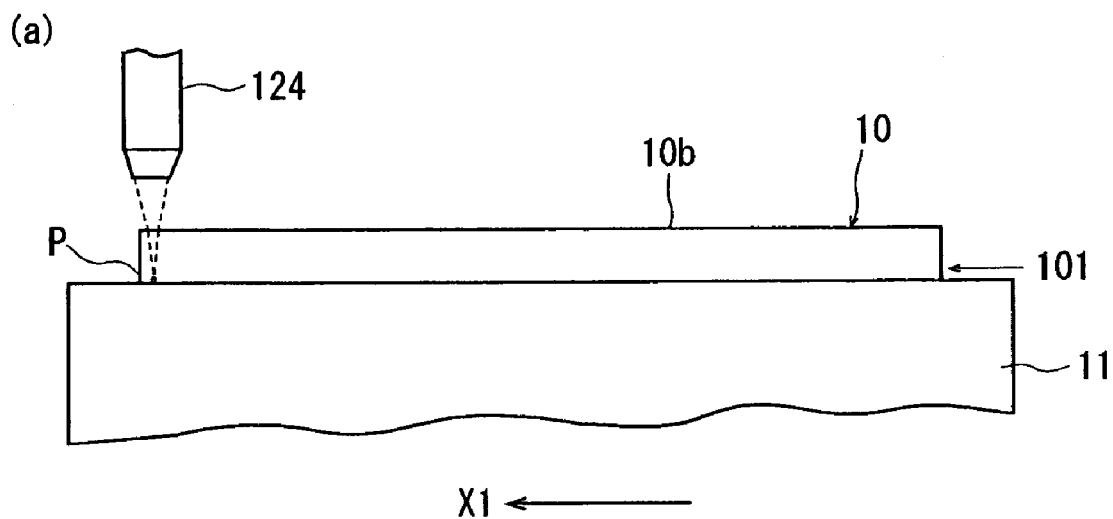
FIGS. 5(a) and 5(b) are explanatory diagrams showing the deteriorated layer forming step in the wafer dividing method of the present invention.
Figure 5:
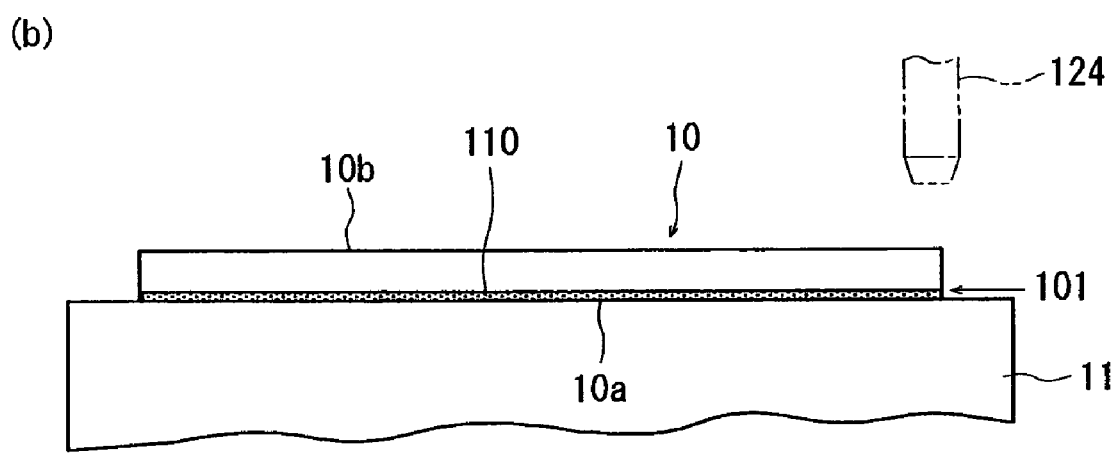

After the dividing line 101 formed on the semiconductor wafer 10 held on the chuck table 11 is detected and the alignment of the laser beam application position is carried out as described above, the chuck table 11 is moved to a laser beam application area where the condenser 124 of the laser beam application means 12 for applying a laser beam is located to bring one end (left end in FIG. 5(a)) of the predetermined dividing line 101 to a position right below the condenser 124 of the laser beam application means 12, as shown in FIG. 5(a). The chuck table 11, that is, the semiconductor wafer 10 is then moved in the direction indicated by the arrow X1 in FIG. 5(a) at a predetermined processing-feed rate while the pulse laser beam capable of passing through the semiconductor wafer 10 is applied from the condenser 124. When the application position of the condenser 124 of the laser beam application means 12 reaches the other end of the dividing line 101 as shown in FIG. 5(b), the application of the pulse laser beam is suspended and the movement of the chuck table 11, that is, the semiconductor wafer 10 is stopped. In this deteriorated layer forming step, the focusing point P of the pulse laser beam is set to an area near the front surface 10a (undersurface) of the semiconductor wafer 10. As a result, a deteriorated layer 110 is exposed to the front surface 10a (undersurface) of the semiconductor wafer 10 and is formed toward the inside from the front surface 10a (undersurface). This deteriorated layer 110 is formed as a molten-resolidified layer, that is, the layer of the wafer has been once molten and then re-solidified.

Figure 6:
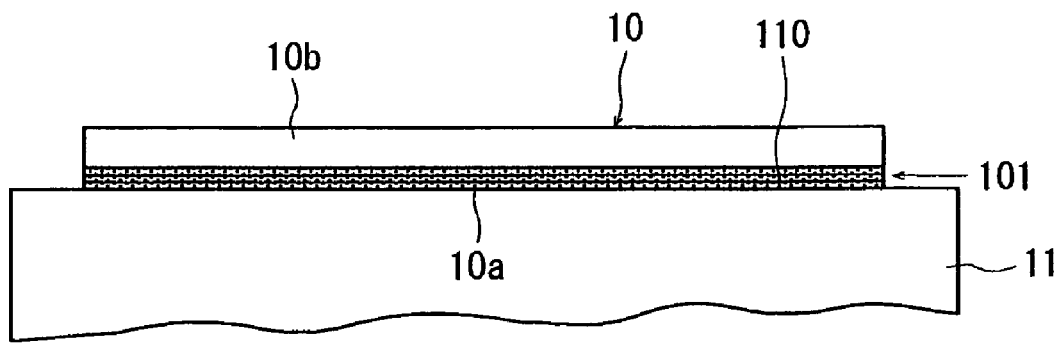
FIG. 6 is an explanatory diagram showing a state wherein laminated deteriorated layers are formed in the inside of the wafer in the deteriorated layer forming step shown in FIG. 5.

The processing conditions in the above deteriorated layer forming step are set as follows, for example.
  Light source: LD excited Q switch Nd:YVO4 laser
  Wavelength: pulse laser beam having a wavelength of 1,064 nm
  Pulse output: 10 μJ
  Focusing spot diameter: 1 μm
  Pulse width: 100 nsec
  Peak power density of focusing point: $1.3 \times 10^{10}$ W/cm$^2$
  Repetition frequency: 100 kHz
  Processing-feed rate: 100 mm/sec When the semiconductor wafer 10 is thick, as shown in FIG. 6, the above-described deteriorated layer forming step is carried out several times by changing the focusing point P stepwise so as to form a plurality of deteriorated layers 110. For example, as the thickness of the deteriorated layer formed once under the above processing conditions is about 50 μm, the above deteriorated layer forming step is carried out three times to form deteriorated layers 110 having a total thickness of 150 μm. In the case of a wafer 10 having a thickness of 300 μm, six deteriorated layers 110 may be formed from the front surface 10a to the back surface 10b along the dividing lines 101 in the inside of the semiconductor wafer 10. The deteriorated layers 110 may be formed only in the inside of the semiconductor wafer 10 without being exposed to the front surface 10a and the back surface 10b.

Figure 7:
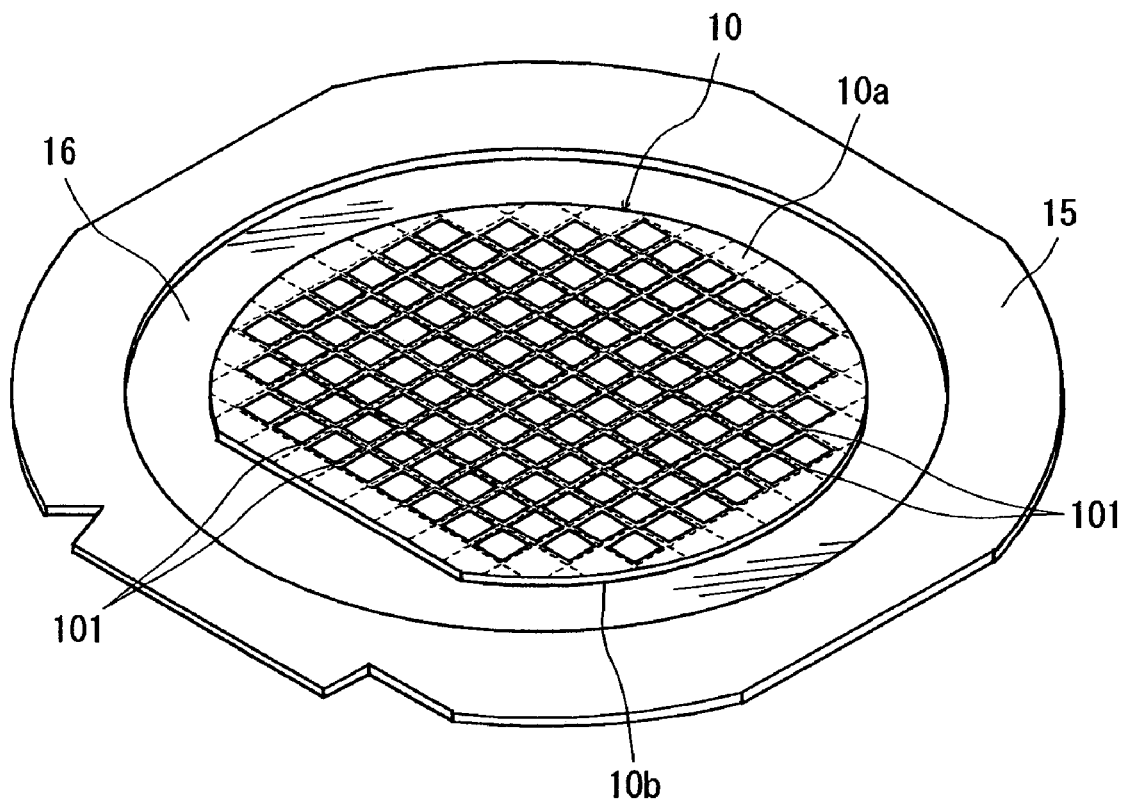
FIG. 7 is a perspective view showing a state of the semiconductor wafer which has been subjected to the deteriorated layer forming step and is put on the front surface of a protective tape mounted to an annular frame.

After the deteriorated layer 110 is formed in the inside of the semiconductor wafer 10 along all the dividing lines 101 in the above-described deteriorated layer forming step, a tape affixing step for putting one surface side of the wafer on the surface of a protective tape mounted on an annular frame is carried out. That is, as shown in FIG. 7, the back surface 10b of the semiconductor wafer 10 is put on the surface of the protective tape 16 whose peripheral portion is mounted on the annular frame 15 so as to cover its inner opening. The above protective tape 16 is prepared by applying acrylic resin-based adhesive to the surface of a 70 μm-thick sheet backing made of polyvinyl chloride (PVC) to a thickness of about 5 μm in the above illustrated embodiment. This tape affixing step may be carried out before the above deteriorated layer forming step. That is, the front surface 10a of the semiconductor wafer 10 is put on the protective tape 16 in such a manner that the back surface 10b faces up, to carry out the above deteriorated layer forming step in a state where the semiconductor wafer 10 is supported to the annular frame 15.

The dividing step for dividing the semiconductor wafer 10 along the dividing lines 101 where the deteriorated layer 110 has been formed comes after the above tape affixing step. This dividing step is carried out by using a dividing apparatus 2 shown in FIGS. 8 to 10.

Figure 8:
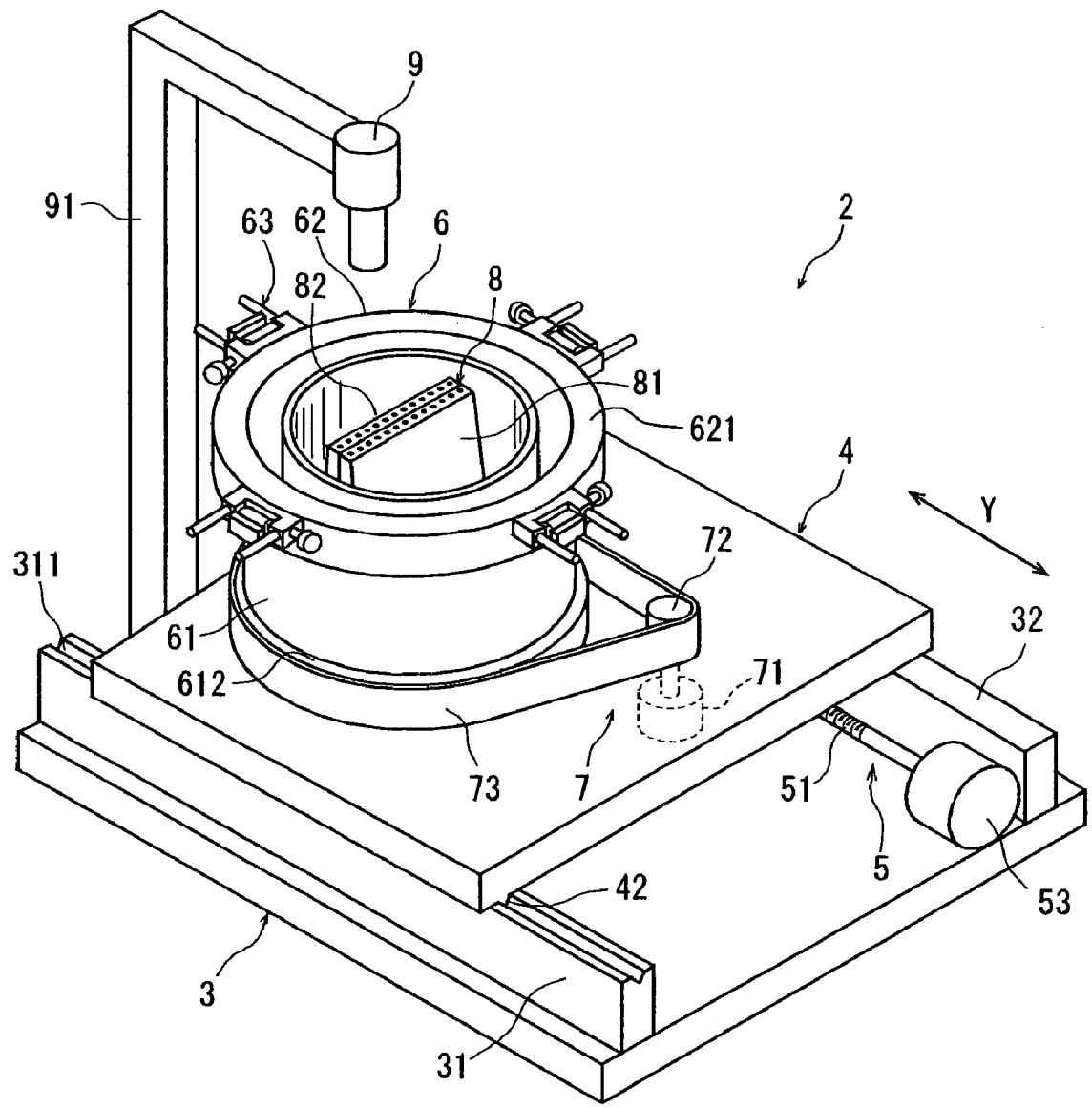
FIG. 8 is a perspective view of a wafer dividing apparatus for carrying out the dividing step in the wafer dividing method of the present invention.
Figure 9:
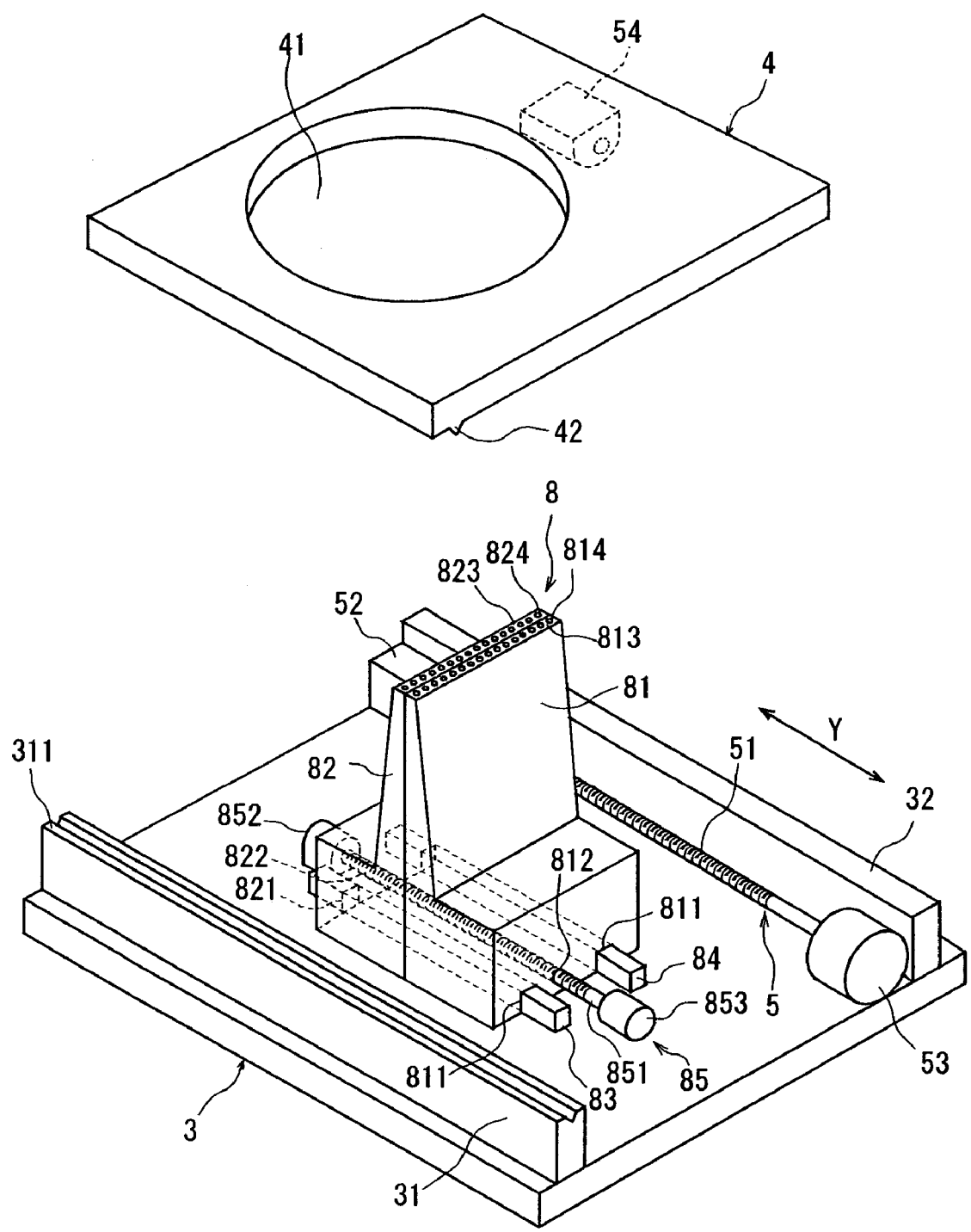
FIG. 9 is an exploded perspective view of the principal section of the dividing apparatus shown in FIG. 8.

FIG. 8 is a perspective view of the wafer dividing apparatus and FIG. 9 is an exploded perspective view of the principal section of the dividing apparatus shown in FIG. 8. The wafer dividing apparatus 2 in the illustrated embodiment comprises a base 3 and a movable table 4 which is mounted on the base 3 in such a manner that it can move in a direction indicated by an arrow Y. The base 3 is rectangular and provided with two guide rails 31 and 32, which are installed on top of the both side portions of the base 3 and parallel to each other in the direction indicated by the arrow Y. A groove 311 having a V-shaped section is formed in the top surface of the guide rail 31.

The above movable table 4 is rectangular and has a circular hole 41 at the center, as shown in FIG. 9. A to-be-guided rail 42 to be slidably fitted to the guide groove 311 formed in the guide rail 31 on the base 3 is formed on the undersurface of one side portion of the movable table 4. The thus constituted movable table 4 is mounted by fitting the to-be-guided rail 42 to the guide groove 311 formed in the guide rail 31 on the base 3 and by placing the undersurface of the other side portion on the guide rail 32 on the base 3, as shown in FIG. 8.

The wafer dividing apparatus 2 in the illustrated embodiment comprises a moving means 5 for moving the movable table 4 in the direction indicated by the arrow Y along the guide rails 31 and 32 on the base 3. This moving means 5 is constituted by a male screw rod 51 arranged parallel to the guide rail 32 on the base 3, a bearing 52 that is mounted on the base 3 and rotatably supports one end of the male screw rod 51, a pulse motor 53 that is connected with the other end of the male screw rod 51 and drives the male screw rod 51, and a female screw block 54 that is provided on the undersurface of the above movable table 4 and is fitted to the male screw rod 51. The thus constituted movable means 5 moves the movable table 4 in the direction indicated by the arrow Y by rotary-driving the pulse motor 53 in one direction or the other direction to turn the male screw rod 51 in one direction or the other direction.

Figure 10:
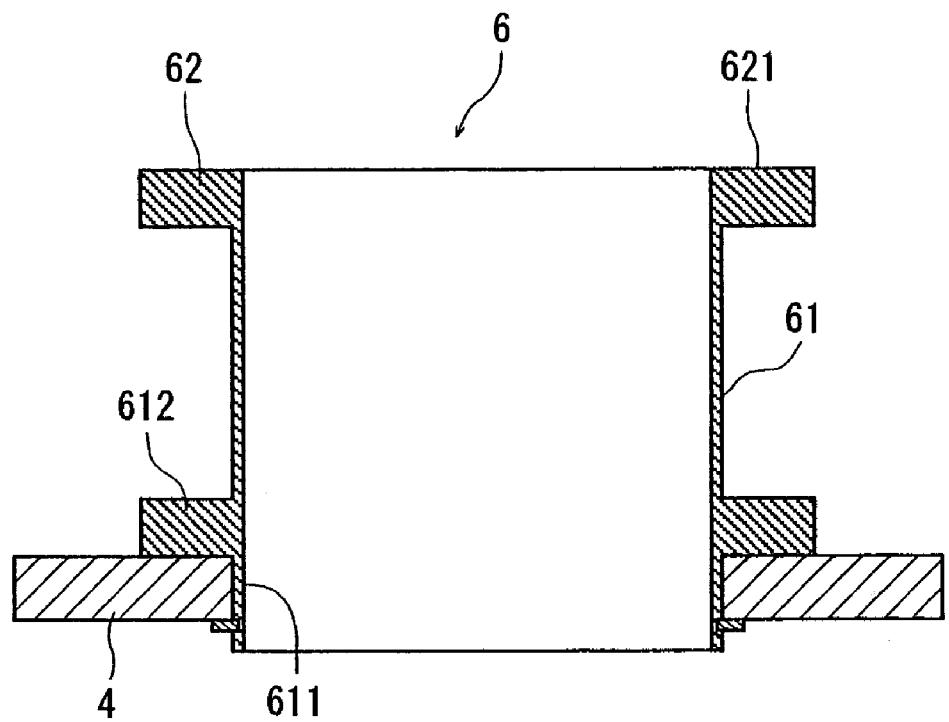
FIG. 10 is a sectional view of a movable table and frame holding means constituting the dividing apparatus shown in FIG. 8.

The wafer dividing apparatus 2 in the illustrated embodiment has a frame holding means 6 for holding the annular frame 15 shown in FIG. 7. As shown in FIG. 8 and FIG. 10, the frame holding means 6 comprises a cylindrical body 61, an annular frame holding member 62 provided on the upper end of the body 61, and a plurality of clamps 63 as a fixing means arranged on the outer periphery of the frame holding member 62. The cylindrical body 61 has, at its lower end, a mounting portion 611 to be turnably fitted to the inner wall of the hole 41 formed in the above movable table 4 and an annular support flange 612 projecting in a radial direction from the outerwall above the mounting portion 611. The annular frame holding member 62 is mounted on the upper end of the thus constituted cylindrical body 61. The top surface of the frame holding member 62 forms a placing surface 621 for placing the annular frame 15, and the annular frame 15 is placed on this mounting surface 621. The annular frame 15 placed on the placing surface 621 is fixed on the frame holding member 62 by the clamps 63. Therefore, the frame holding means 6 functions as a tape holding means for holding the protective tape 16 affixed to the above semiconductor wafer 10 via the annular frame 15.

The wafer dividing apparatus 2 in the illustrated embodiment comprises a turning means 7 for turning the above frame holding means 6, as shown in FIG. 8. This turning means 7 is composed of a pulse motor 71 mounted on the base 4, a pulley 72 connected to the rotary shaft of the pulse motor 71, and an endless belt 73 wound round the pulley 72 and the support flange 612 of the cylindrical body 61. The thus constituted turning means 7 turns the frame holding means 6 through the pulley 72 and the endless belt 73 by driving the pulse motor 71.

The wafer dividing apparatus 2 in the illustrated embodiment has a tensile force application means 8 for acting tensile force in a direction perpendicular to the dividing lines 101 on the semiconductor wafer 10 supported to the annular frame 15 held on the above annular frame holding member 62 via the protective tape 16. The tensile force application means 8 is mounted on the above base 3 and arranged within the cylindrical body 61. This tensile force application means 8 has a first suction-holding member 81 and a second suction-holding member 82. As shown in FIG. 9, the first suction-holding member 81 and the second suction-holding member 82 are so arranged as to be moved along a pair of guide rails 83 and 84 installed in parallel to each other on the above base 3 in the direction indicated by the arrow Y. That is, two to-be-guided grooves 811 and 811 and two to-be-guided grooves 821 and 821 are formed in the undersurfaces of the first suction-holding member 81 and the second suction-holding member 82 at an interval corresponding to the interval between the above pair of guide rails 83 and 84, respectively. By fitting the two to-be-guided grooves 811 and 811 and the two to-be-guided grooves 821 and 821 with the pair of guide rails 83 and 84, respectively, the first suction-holding member 81 and the second suction-holding member 82 can be moved along the pair of guide rails 83 and 84.

The tensile force application means 8 in the illustrated embodiment has a moving means 85 for moving the first suction-holding means 81 and the second suction-holding means 82 along the guide rails 83 and 84 mounted on the base 3 in the direction indicated by the arrow Y. This moving means 85 comprises a male screw rod 851 that is arranged parallel to the guide rails 83 and 84, a bearing 852 for rotatably supporting one end of the male screw rod 851, and a pulse motor 853 that is connected to the other end of the male screw rod 851 and rotary-drives the male screw rod 851. The male screw rod 851 is screwed into threaded holes 812 and 822 formed in the first suction-holding member 81 and the second suction-holding member 82. Threads in the threaded hole 812 formed in the first suction-holding member 81 and the threaded hole 822 formed in the second suction-holding member 82 are formed in opposite directions. Therefore, on the male screw rod 851, male screws in an area to be screwed into the threaded hole 821 formed in the first suction-holding member 81 and male screws in an area to be screwed into the threaded hole 822 formed in the second suction-holding member 82 are formed in opposite directions. The thus formed moving means 85 moves the first suction-holding member 81 and the second suction-holding member 82 in a direction for separating them from each other by rotary-driving the pulse motor 853 in one direction to turn the male screw rod 851 in one direction, while moves them in a direction for bringing them close to each other by rotary-driving the pulse motor 853 in the other direction to turn the male screw rod 851 in the other direction. Air pistons may be used as the moving means. That is, an air piston is connected to the first suction-holding means 81 and the second suction-holding means 82 so that the first suction-holding means 81 and the second suction-holding means 82 are moved apart from each other or close to each other by the movement of the air pistons.

The above first suction-holding means 81 and the second suction-holding means 82 have a prolonged rectangular first holding surface 813 and a prolonged rectangular second holding surface 823 extending parallel to each other in a direction perpendicular to the arrow Y direction at the upper ends, respectively. The first holding surface 813 and the second holding surface 823 have substantially the same length as the diameter of the above semiconductor wafer and are positioned at substantially the same height as the placing surface 621 of the above frame holding member 62. Suction holes 814 and 824 are formed in the first holding surface 813 of the first suction-holding member 81 and the second holding surface 823 of the second suction-holding member 82, respectively. These suction holes 814 and 824 are communicated to a suction means that is not shown. Therefore, when the suction means (not shown) is activated, negative pressure acts on the suction holes 814 and 824 so that the semiconductor wafer 10 can be suction-held on the first holding surface 813 and the second holding surface 823 via the above protective tape 16.

Returning to FIG. 8, the wafer dividing apparatus 2 in the illustrated embodiment has a detection means 9 for detecting the dividing lines 101 of the semiconductor wafer 10 supported to the annular frame 15 shown in FIG. 7 held on the above annular frame holding member 62 via the protective tape 16. The detection means 9 is mounted on an L-shaped support pole installed on the base 3. This detection means 9 is composed of an optical system and an image pick-up device (CCD) and is located above the above tensile force application means 8. The thus constituted detection means 9 picks up an image of a dividing line 101 of the semiconductor wafer 10 supported to the annular frame 15 held on the above annular frame holding member 62 through the protective tape 16, converts the image signal into an electrical signal and sends it to the control means that is not shown.

The wafer dividing apparatus 2 in the illustrated embodiment is constituted as described above and its operation will be described hereinbelow with reference mainly to FIG. 8, FIG. 11 and FIGS. 12(a) and 12(b).

Figure 11:
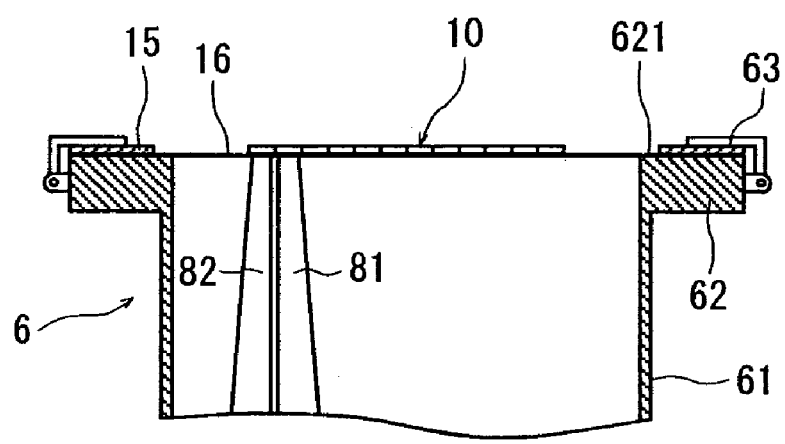
FIG. 11 is a sectional view of the principal section showing a state where the frame holding means constituting the dividing apparatus shown in FIG. 8 holds the annular frame supporting the semiconductor wafer through the protective tape.

The annular frame 15 supporting the semiconductor wafer 10, whose strength has been reduced along the dividing lines 101, through the protective tape 16 as shown in FIG. 7 is placed on the placing surface 621 of the frame holding member 62 constituting the frame holding means 6 as shown in FIG. 11 and fixed on the frame holding member 62 by the clamps 63.

Figure 12:
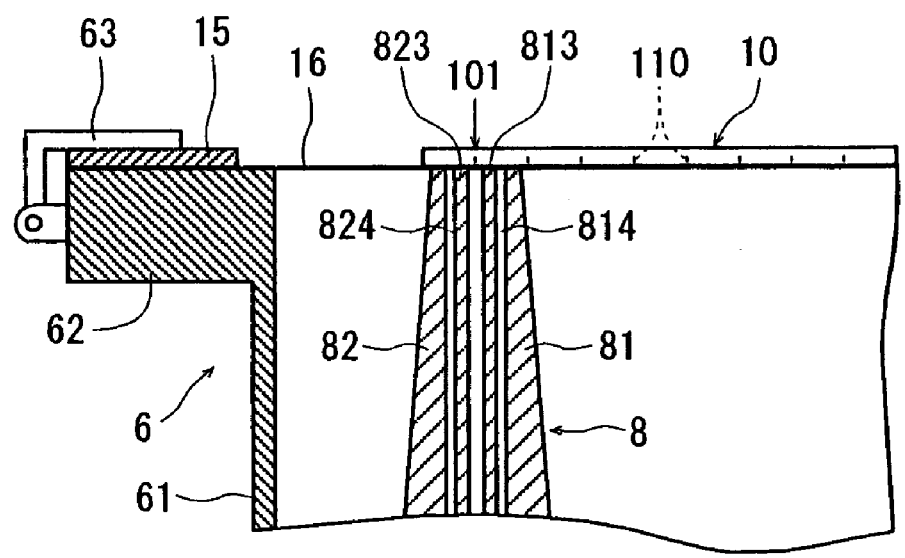
FIGS. 12(a) and 12(b) are explanatory diagrams showing the dividing step in the wafer dividing method of the present invention.
Figure 12:
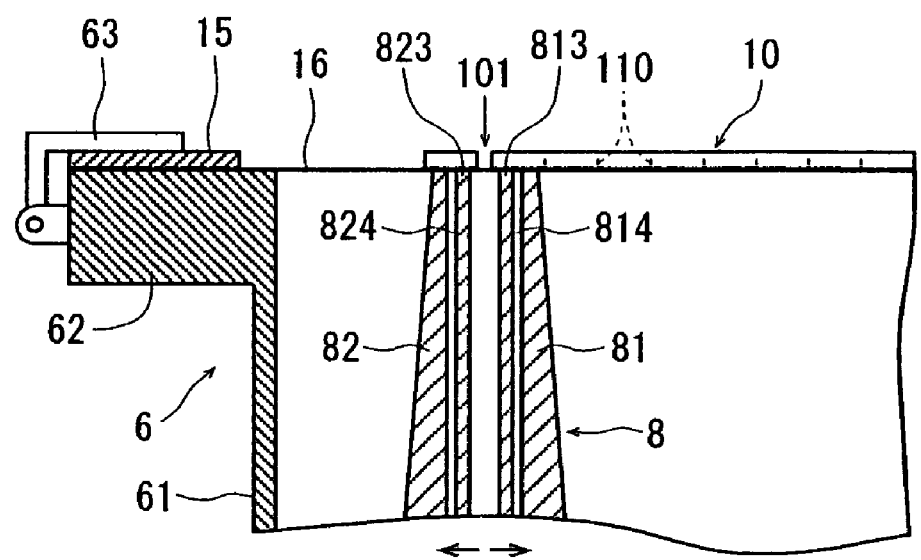

After the annular frame 15 supporting the semiconductor wafer 10 through the protective tape 16 is held on the frame holding member 62, the moving means 5 is activated to move the movable table 4 in the direction (see FIG. 8) indicated by the arrow Y to bring one dividing line 101 (the most left dividing line in the illustrated embodiment) formed in the predetermined direction of the semiconductor wafer 10 to a position between the first holding surface 813 of the first suction-holding member 81 and the second holding surface 823 of the second suction-holding member 82 constituting the tensile force application means 8, as shown in FIG. 12(a). At this point, an image of the dividing line 101 is picked up by the detection means 9 to align the first holding surface 813 with the second holding surface 823. After one dividing line 101 is thus positioned between the first holding surface 813 of the first suction-holding member 81 and the second holding surface 823 of the second suction-holding member 82, the suction means (not shown) is activated to act negative pressure on the suction holes 814 and 824 so as to suction-hold the semiconductor wafer 10 on the first holding surface 813 and the second holding surface 823 via the protective tape 16 (holding step).

After the above holding step, the pulse motor 853 constituting the moving means of the tensile force application means 8 is rotary-driven in one direction to turn the male screw rod 851 in one direction to move the first suction-holding member 81 and the second suction-holding member 82 apart from each other. As a result, as shown in FIG. 12(b), tensile force acts in a direction perpendicular to the dividing line 101 on the dividing line 101 positioned between the first holding surface 813 of the first suction-holding member 81 and the second holding surface 823 of the second suction-holding member 82, thereby dividing the semiconductor wafer 10 along the dividing line 101 (dividing step). In this dividing step, as the strength of the semiconductor wafer 10 has been reduced by the formation of the deteriorated layer 110 along the dividing line, the semiconductor wafer 10 can be fractured along the dividing line 101 by moving the first suction-holding member 81 and the second suction-holding member 82 by about 0.5 mm in the direction for separating them from each other.

In the illustrated embodiment, the semiconductor wafer 10 is suction-held on the first suction-holding member 81 and the second suction-holding member 82 positioned on both sides of the dividing line 101 via the protective tape 16, and the first suction-holding member 81 and the second suction-holding member 82 are moved in the direction for separating them from each other so as to act tensile force in a direction perpendicular to the dividing line 101. Therefore, the semiconductor wafer 10 can be divided along the dividing line 101 where the deteriorated layer 110 has been formed, accurately and surely. Consequently, even when the semiconductor wafer 10 has a test metal pattern called "test element group (TEG)" for testing the function of each circuit on the dividing lines, this metal pattern can also be divided along the dividing lines accurately.

After the dividing step for dividing the semiconductor wafer 10 along one dividing line 101 formed in the predetermined direction as described above, the suction-holding of the semiconductor wafer 10 on the first suction-holding member 81 and the second suction-holding member 82 is cancelled. Thereafter, the moving means 5 is activated to move the movable table 4 a distance corresponding to the interval between the dividing lines in the direction (see FIG. 8) indicated by the arrow Y to bring a dividing line 101 adjacent to the dividing line 101 that was subjected to the above dividing step to a position between the first holding surface 813 of the first suction-holding member 81 and the second holding surface 823 of the second suction-holding member 82 constituting the tensile force application means 8. Thereafter, the above holding step and the dividing step are carried out.

After the above holding step and the dividing step are carried out on all the dividing lines 101 formed in the predetermined direction as described above, the turning means 7 is activated to turn the frame holding means 6 at 90°. As a result, the semiconductor wafer 10 held on the frame holding member 62 of the frame holding means 6 is also turned at 90° so that dividing lines 101 formed in a direction perpendicular to the dividing lines 101 which have been formed in the predetermined direction and subjected to the above dividing step, become parallel to the first holding surface 813 of the first suction-holding member 81 and the second holding surface 823 of the second suction-holding member 82. Subsequently, the above holding step and the dividing step are carried out on all the dividing lines 101 formed in the direction perpendicular to the dividing lines 101 which have been subjected to the above dividing step to divide the semiconductor wafer 10 into individual semiconductor chips along the dividing lines 101.

What is claimed is:

1. A method of dividing a wafer whose strength is reduced along a plurality of dividing lines formed on the front surface in a lattice pattern, along the dividing lines, comprising:

a tape affixing step for affixing a protective tape to one surface side of the wafer;

a holding step for positioning a first suction-holding member and a second suction-holding member on both sides of a dividing line and suction-holding the wafer on the first suction-holding member and the second suction-holding member through the protective tape; and a dividing step for moving the first suction-holding member and the second suction-holding member in a direction for separating them from each other to exert tensile force in a direction perpendicular to the dividing line.

2. A wafer dividing apparatus for dividing a wafer whose strength is reduced along a plurality of dividing lines formed on the front surface in a lattice pattern, along the dividing lines, comprising:

a tape holding means for holding a protective tape affixed to one surface side of the wafer; and a tensile force application means for suction-holding the wafer supported to the tape holding means on both sides of a dividing line through the protective tape and exerting tensile force to the wafer in a direction perpendicular to the dividing lines.

3. The wafer dividing apparatus according to claim 2, wherein the tensile force application means comprises a first suction-holding member and a second suction-holding member for suction-holding the wafer through the protective tape on both sides of a dividing line, and a moving means for moving the first suction-holding member and the second suction-holding member in a direction for separating them from each other.

4. The wafer dividing apparatus according to claim 2, wherein the protective tape is mounted on an annular frame, and the tape holding means is composed of a frame holding means for holding the annular frame.

5. The wafer dividing apparatus according to claim 4, wherein the frame holding means comprises a cylindrical body and an annular frame holding member mounted on the upper end of the body, and the first suction-holding member, the second suction-holding member and the moving means are installed within the cylindrical body.

6. The wafer dividing apparatus according to claim 5, wherein the first suction-holding member, the second suction-holding member and the moving means are mounted on the base, and the frame holding means is mounted on a movable table mounted on the base in such a manner that it can be moved in a predetermined direction.

7. The wafer dividing apparatus according to claim 6, wherein the frame holding means is turnably supported on the movable table, and a turning means for turning the frame holding means is provided.

* * * * *